United States Patent
Schreiber

(10) Patent No.: US 7,156,622 B2
(45) Date of Patent: Jan. 2, 2007

(54) COMPRESSOR BLADE FOR AN AIRCRAFT ENGINE

(75) Inventor: Karl Schreiber, Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/780,882

(22) Filed: Feb. 19, 2004

(65) Prior Publication Data
US 2004/0184921 A1 Sep. 23, 2004

(30) Foreign Application Priority Data
Feb. 22, 2003 (DE) ................ 103 07 610

(51) Int. Cl.
*F01D 5/14* (2006.01)
(52) U.S. Cl. .................. 416/224; 416/229 A
(58) Field of Classification Search ........... 416/229 A, 416/229 R, 230, 224
See application file for complete search history.

(56) References Cited

U.S. PATENT DOCUMENTS

| | | | |
|---|---|---|---|
| 2,734,586 A * | 2/1956 | Wright et al. | 416/226 |
| 3,294,366 A | 12/1966 | Coplin | |
| 3,466,725 A * | 9/1969 | Helmut | 29/889.71 |
| 3,637,325 A | 1/1972 | Morley | |
| 3,695,778 A | 10/1972 | Taylor | |
| 3,758,234 A | 9/1973 | Goodwin | |
| 4,006,999 A | 2/1977 | Brantley | |
| 4,738,594 A | 4/1988 | Sato et al. | |
| 5,483,034 A | 1/1996 | Havard et al. | |
| 5,486,096 A * | 1/1996 | Hertel et al. | 416/224 |
| 6,431,837 B1 | 8/2002 | Velicki | |
| 6,454,533 B1 * | 9/2002 | Beyer | 416/90 R |

FOREIGN PATENT DOCUMENTS

| | | |
|---|---|---|
| DE | 1953209 | 5/1970 |
| DE | 1956885 | 6/1970 |
| DE | 1628355 | 10/1970 |
| DE | 2631856 | 2/1977 |
| DE | 3434001 | 4/1985 |
| DE | 4225599 | 2/1994 |
| GB | 950434 | 2/1964 |
| GB | 1130285 | 10/1968 |
| GB | 1276458 | 6/1972 |
| GB | 2147055 | 5/1985 |

OTHER PUBLICATIONS

German Search Report dated Jun. 25, 2003.
European Search Report dated May 7, 2004.

* cited by examiner

*Primary Examiner*—Edward K. Look
*Assistant Examiner*—Devin Hanan
(74) *Attorney, Agent, or Firm*—Timothy J. Klima

(57) ABSTRACT

A compressor blade for an aircraft engine includes a blade core made of a fiber compound material and a metallic enclosing structure. The enclosing structure is of a multi-part design and includes blanks (4, 5) attached to the blade core by a metallic weave (6) on the suction side and on the pressure side, with the two blanks being firmly connected at the aerodynamically shaped leading edge of the compressor blade by to a leading-edge former (3). Depending on the specific loads applied on the pressure side and on the suction side, welds attaching the blanks to the leading-edge former (8, 9) are offset relative to each other and the material thicknesses of the components of the enveloping structure are matched to each other.

16 Claims, 1 Drawing Sheet

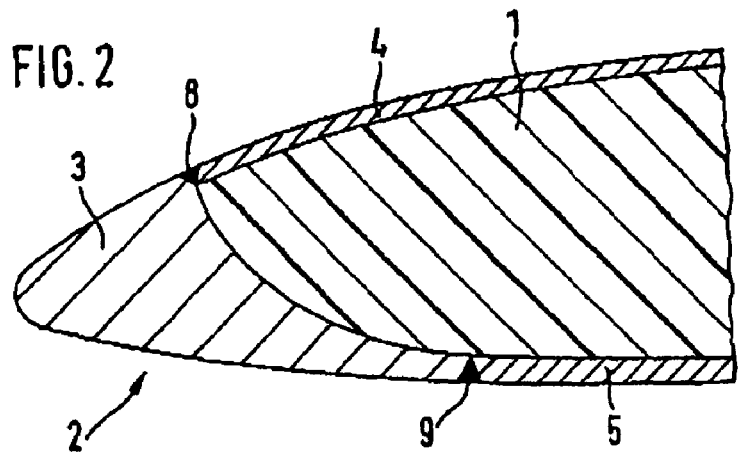
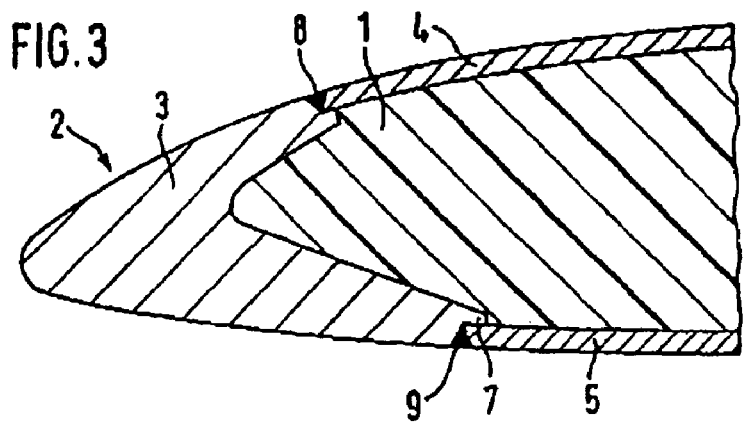
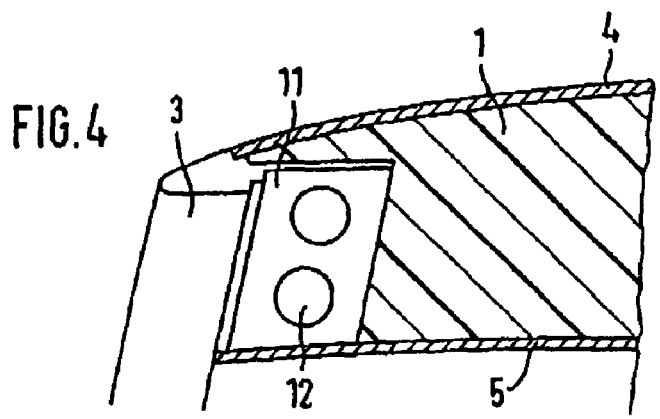
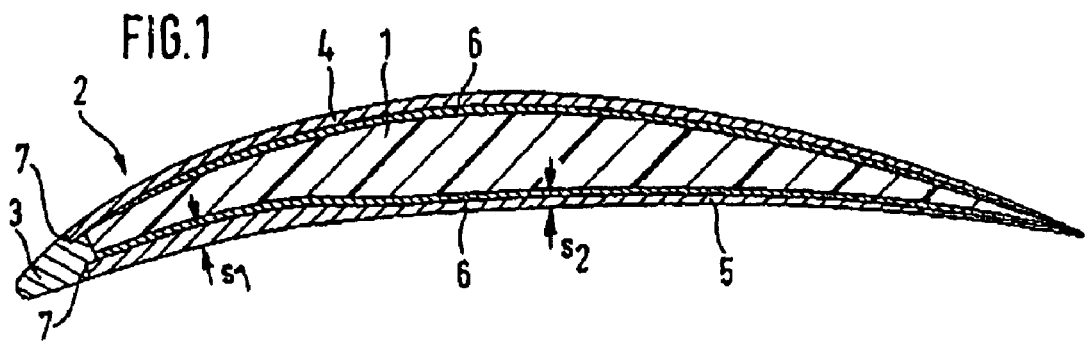

COMPRESSOR BLADE FOR AN AIRCRAFT ENGINE

This application claims priority to German Patent Application DE10307610.7 filed Feb. 22, 2003, the entirety of which is incorporated by reference herein.

BACKGROUND OF THE INVENTION

This invention relates to a compressor blade for an aircraft engine whose airfoil comprises a blade core made of a fiber compound material and a metallic enclosing structure.

The blades of turbomachines, in particular of aircraft engines, are subject to considerable loads arising from centrifugal forces, gas pressure and airfoil vibrations excited by the fluid flow, but also from erosion due to ingested foreign matter or corrosion. The compressor blades, especially the fan blades, of aircraft engines are additionally loaded to a considerable extent by the impingement of birds in the event of a bird strike. The correspondingly stringent safety requirements are in opposition to the endeavor to cut the manufacturing costs and to lower the specific fuel consumption by reducing the weight of the blades and, hence, of the burst protection elements of the engine. The respective design features are similarly applicable to both, rotor blades and stator vanes.

For weight saving, blades of hollow design are known which, however, are extremely costly to manufacture and economically justifiable only in the case of large engines. Since the use of hollow-design blades in small-power engines is not effective in terms of the ratio between the achievable weight saving and the cost investment, solid titanium is being used to manufacture the correspondingly smaller blades of such engines. While these blades withstand the above-mentioned loads, they are susceptible to the vibrations caused by the fluid flow and are also heavy and costly.

Furthermore, blades in fiber compound materials have been developed which, while having a considerable weight advantage over solid blades made of an appropriate metal and possessing appropriate specific strength and high intrinsic damping characteristics against vibrations, do not satisfy the stringent strength criteria as regards erosion or a bird strike to the surface or the leading edge of the airfoil.

Specification U.S. Pat. No. 5,655,883 describes a compressor blade of a carbon fiber compound material in an epoxy resin matrix and a titanium enclosing structure whose titanium section covers the suction side as well as the leading-edge, trailing-edge and blade-tip areas.

From Specification DE 196 27 860 C1, a blade for a turbomachine is known which comprises a supporting laminated structure of fiber-reinforced plastic whose surface area is partly of fully covered with a layer of metallic fibers or filaments which are bonded to the mating fiber-reinforced plastic by means of the same resin binding agent.

Finally, Specification EP 1106783 A2 proposes a turbomachine blade whose blade-core supporting structure is made of a compound material and is surrounded by a metallic enclosing structure consisting of a plate in titanium or a similar material and a metal-felt weave welded or brazed to the inner side of the plate.

While the above-mentioned engine blades possess adequate intrinsic strength, corrosion resistance and vibration damping characteristics in combination with a significantly lower weight than the known solid metal blades, they do not satisfy the stringent safety requirements for erosion resistance and, in particular, impact strength in the event of a bird strike or an impingement of other objects. The covering structure can be damaged by prolonged erosion or a bird strike, as a result of which the blade core consisting of a fiber compound material may be destroyed. Furthermore, the known supporting and enveloping structures do not allow an aerodynamically favorable blade geometry to be produced, especially in the air inflow area.

BRIEF SUMMARY OF THE INVENTION

The present invention, in a broad aspect, provides for a type of compressor blade for turbomachines and aircraft engines for a large thrust range which is of light weight and aerodynamically favorable design and which is capable of withstanding the loads arising from a bird strike or from eroding matter, in addition to the operating loads.

It is a particular object of the present invention to provide solution to the above problematics by a compressor blade designed in accordance with the features described herein. Further objects and advantages of the present invention become apparent from the description below.

In other words, the idea underlying the present invention is that the metallic enclosing structure of the blade core made of fiber compound material is of a multi-part design and includes a blank for the suction side, a blank for the pressure side and an aerodynamically shaped leading-edge former. The leading-edge former, which is connected to the two blanks, allows the maximum loads caused by bird strike or eroding matter to be taken up and the aerodynamic characteristics to be set optimally. The design in three enclosing components enables the materials applied and the material thicknesses to be varied in accordance with the respective loads to ensure the required strength properties and to minimize the material input to save weight also on the side of the enveloping structure. The multi-part design of the enclosing structure using a leading-edge former also provides for easy repair of the compressor blade.

In a further development of the present invention, the leading-edge former is asymmetrical such that the blanks and their connections to the leading-edge former are offset relative to each other. Thus, the joint and the blank on the pressure side of the compressor blade, which are both subject to higher loads, are located farther away from the leading edge and relieved. Where a fillet is provided on the inner side of the leading-edge former facing the blade core, the asymmetry of said leading-edge former can also relate to different material thicknesses on the pressure side and on the suction side, with more material being present on the pressure side than on the suction side. Similarly, the thickness of the blanks can be different, including thickness variations within the blank, but with the thicker blank portion connecting to the leading-edge former.

In an advantageous development of the present invention, an attaching rib can be formed onto the side of the leading-edge former facing the blade core, this attaching rib providing for an intimate tie between the leading-edge former and the fiber compound material of the blade core. The intimate tie between the leading edges and the fiber material can, for example, also be accomplished by conformally weaving in the leading edges.

BRIEF DESCRIPTION OF THE DRAWINGS

The present invention is more fully described in light of the accompanying drawings showing multiple embodiments. On the drawings:

FIG. 1 is a sectional view of the airfoil of a compressor blade for an aircraft engine in accordance with the present invention, FIG. 2 is a detailed representation of the area of the leading edge of the compressor blade shown in FIG. 1 in a first embodiment, FIG. 3 is a detailed representation of the leading edge of the compressor blade shown in FIG. 1 in a second embodiment, and FIG. 4 is a detailed representation of the compressor blade in the area of the leading edge in a third embodiment.

DETAILED DESCRIPTION OF THE INVENTION

The compressor blade includes a high-stiffness blade core 1 made of a fiber compound material, a metallic enclosing structure 2 with a leading-edge former 3, and a blade root (not shown) which retains the compressor blade to a disk (not shown).

The fiber compound material of the blade core serves, in a known manner, for taking up the centrifugal forces and the bending and torsional loads and for vibration damping and provides a weight saving compared to compressor blades made of solid metal. The metallic enclosing structure 2 includes a first blank 5 on the pressure side of the compressor blade and a second blank 4 on the suction side of the compressor blade. On the inner sides of the blanks 4 and 5 facing the blade core 1, a metallic weave 6 is attached which provides for an intimate, firm tie between the blanks 4 and 5 and the fiber compound material of the blade core 1. Alternatively, this intimate tie between the blanks and the fiber compound material can be pretreated according to the state of the art, for example by etching or roughening the blanks. The blanks 4, 5 are capable of taking up part of the impact forces and erosion loads arising from bird strike or impinging grains of sand or hail, respectively. Since the impact and erosion effects are particularly high in the area of the leading edge (air inflow edge), a conventionally manufactured blade can be destroyed by bird strike or be damaged by continually progressing erosion, corrosion or crack formation in this area, as a consequence of which the blade core 1 could also be affected. In order to avoid this, both blanks 4 and 5 are joined with each other at the blade leading edge by means of a leading-edge former 3.

The leading-edge former 3 is preferably constructed of solid metal, for example austenitic steel, and features recesses 7 on the side facing the edges of the blanks 4, 5 which correspond to the length and thickness of the respective blank. In each recess 7, the leading edge of the respective blank 4, 5 is joined to the leading-edge former 3 by welding, for example laser or diffusion welding, in such a manner that the outer surface of the leading-edge former 3 is flush with the outer surface of the respective blank, thus making the transition between the blank and the leading-edge former insensitive to notch effects.

As shown on the drawing, in particular FIG. 2, the leading-edge former 3 is designed such that the two welds 8 and 9, which connect the blanks 4, 5 to the leading-edge former 3, are offset relative to each other. Thus, weld inspection can be performed without mutual flaw interference. The correct arrangement of the joints (recesses 7) on the leading-edge former 3 is, however, of great importance and must be such that the joint for the weld 9, which is located on the higher loaded pressure side (blank 5), is farther away from the leading edge (tip of the leading-edge former 3). Thus, the joint between the leading-edge former 3 and the blank 5 (pressure side) is protected against excessive stressing.

In the embodiment of FIG. 3, a fillet (depression) 10 is formed into the surface of the leading-edge former 3 facing the blade core 1 (fiber compound material) to provide a large contact area and, thus, an optimum tie with the fiber compound material and to reduce the mass of the leading-edge former 3, in particular if it is very long and thick. Obviously, the dimensioning of the leading-edge former 3 is variable and can be designed such that optimum aerodynamic properties are achieved, for example by providing a very small tip radius.

FIG. 4 illustrates a further embodiment of the leading-edge former 3 whose side facing the blade core is provided with a formed-on attaching rib 11 which protrudes into the fiber compound material, and which may also be enlarged in the form of a wedge towards the blade core 1 to create an intimate tie between the blade core 1 and the leading-edge former 3. As becomes apparent from FIG. 4, in particular, the attaching rib 11 is provided with attaching holes 12 by which the fiber material is connected to the attaching rib 11. The attaching rib 11 can also feature other profiles, structures or anchoring elements to produce a firm connection between the leading-edge former 3 and the blade core 1.

As mentioned above, the loading of the compressor blade is higher on the pressure side than on the suction side and again higher in the vicinity of the leading edge than in an area farther away from it. The multi-part design of the metallic enclosing structure 2, consisting of the leading-edge former and the two blanks, enables its various components to be made of different materials in correspondence with the respective load or to provide blanks with different thicknesses. This design allows the blanks and the leading-edge former to be made of different materials in line with the respective requirements. Nickel-base materials, austenitic steels and titanium-base materials are particularly suited. Due to the high loads in the leading edge-near area on the pressure side, the blank 5, as shown in FIG. 1, is provided with varying wall thicknesses s1, s2, . . . , and is referred to as "tailored blank". Accordingly, the section with the greatest wall thickness s1 attaches directly to the leading-edge former 3.

As mentioned above, the length of the leading-edge former 3 is variable in dependence of the load to be expected. Also, as shown in FIG. 3, the profile of the leading-edge former can be made such, that more material is present on the pressure side than on the suction side.

The compressor blade described by way of the above embodiments, with a metallic enclosing structure 2 made up of the individual elements 3, 4 and 5, enables the material thickness, material type and shape of the leading edge to be adapted to the applicable load conditions such that high stability, longevity and optimum aerodynamic properties are ensured with minimum weight. Cracks, material deterioration or damage by erosion or corrosion, which most likely occur in the highly loaded leading edge area, can be repaired inexpensively by replacement of the leading-edge former 3 or by material build-up.

The different features disclosed above can be combined in different manners to create new embodiments.

What is claimed is:

1. A compressor blade for an aircraft engine, comprising:
an airfoil having a blade core made of a fiber compound material and a metallic enclosing structure,
wherein the metallic enclosing structure is of a multi-part design and includes a blank on a suction side of the airfoil and a blank on a pressure side of the airfoil which are connected in an area of a leading edge of the airfoil to a leading-edge former constructed of a solid metal, the leading-edge former being thicker on the pressure side than on the suction side and including an attaching rib facing towards the blade core and which protrudes into the fiber compound material, the blank on the pressure-side being thicker than the blank on the suction side.

2. A compressor blade in accordance with claim 1, wherein the leading-edge former has an asymmetrical cross-section and welds attaching end faces of the blanks to the former are offset relative to each other, with a pressure-side weld being positioned farther away from the leading edge than a suction-side weld.

3. A compressor blade in accordance with claim 2, wherein outer surfaces of the blanks and of the leading-edge former are flush with each other.

4. A compressor blade in accordance with claim 3, wherein the leading-edge former includes recesses for locating ends of the blanks.

5. A compressor blade in accordance with claim 2, wherein the asymmetrical leading edge-former is longer on the pressure side than on the suction side and includes a fillet facing towards the blade core into which the fiber compound material protrudes.

6. A compressor blade in accordance with claim 1, wherein the attaching rib is configured in the form of a wedge towards the blade core.

7. A compressor blade in accordance with claim 1, wherein thicknesses of at least one of the blanks varies over the width of the blank from the leading edge to a trailing edge, in dependence of the load applied to the blank.

8. A compressor blade in accordance with claim 1, wherein the leading-edge former includes an aerodynamically favorable shape with a tip radius.

9. A compressor blade in accordance with claim 1, wherein at least one of the blanks and the leading-edge former are constructed from the group of nickel-base materials, austenitic steels and titanium-base materials.

10. A compressor blade in accordance with 1, wherein the metallic enclosing structure comprises a metal weave on a side facing the blade core.

11. A compressor blade in accordance with claim 1, wherein the attaching rib includes surface structure by which the fiber compound material can be interwoven with the leading-edge former.

12. A compressor blade for an aircraft engine, comprising:
an airfoil having a blade core made of a fiber compound material and a metallic enclosing structure,
wherein the metallic enclosing structure is of a multi-pad design and includes a blank on a suction side of the airfoil and a blank on a pressure side of the airfoil which are connected in an area of a leading edge of the airfoil to a leading-edge former constructed of a solid metal, the blank on the pressure-side being thicker than the blank on the suction side.

13. A compressor blade for an aircraft engine, comprising:
an airfoil having a blade core made of a fiber compound material and a metallic enclosing structure,
wherein the metallic enclosing structure is of a multi-part design and includes a blank on a suction side of the airfoil and a blank on a pressure side of the airfoil which are connected in an area of a leading edge of the airfoil to a leading-edge former constructed of a solid metal, at least two of the individual components of the enclosing structure are constructed of different metal materials in accordance with the respective load conditions.

14. A compressor blade for an aircraft engine, comprising:
an airfoil having a blade core made of a fiber compound material and a metallic enclosing structure,
wherein the metallic enclosing structure is of a multi-pad design and includes a blank on a suction side of the airfoil and a blank on a pressure side of the airfoil which are connected in an area of a leading edge of the airfoil to a leading-edge former constructed of a solid metal, the metallic enclosing structure comprising a metal weave on a side facing the blade core.

15. A compressor blade for an aircraft engine, comprising:
an airfoil having a blade core made of a fiber compound material and a metallic enclosing structure,
wherein the metallic enclosing structure is of a multi-part design and includes a blank on a suction side of the airfoil and a blank on a pressure side of the airfoil which are connected in an area of a leading edge of the airfoil to a leading-edge former constructed of a solid metal, the leading-edge former being thicker on the pressure side than on the suction side.

16. A compressor blade for an aircraft engine, comprising:
an airfoil having a blade core made of a fiber compound material and a metallic enclosing structure,
wherein the metallic enclosing structure is of a multi-part design and includes a blank on a suction side of the airfoil and a blank on a pressure side of the airfoil which are connected in an area of a leading edge of the airfoil to a leading-edge former constructed of a solid metal, the leading-edge former including an attaching rib facing towards the blade core and which protrudes into the fiber compound material.

* * * * *